US012375766B2

(12) United States Patent  
Barbieri et al.

(10) Patent No.: US 12,375,766 B2  
(45) Date of Patent: Jul. 29, 2025

(54) VIDEO SYNTHESIS VIA MULTIMODAL CONDITIONING

(71) Applicants: Francesco Barbieri, Marina del Rey, CA (US); Ligong Han, Edison, NJ (US); Hsin-Ying Lee, San Jose, CA (US); Shervin Minaee, Bellevue, WA (US); Kyle Olszewski, Los Angeles, CA (US); Jian Ren, Hermosa Beach, CA (US); Sergey Tulyakov, Santa Monica, CA (US)

(72) Inventors: Francesco Barbieri, Marina del Rey, CA (US); Ligong Han, Edison, NJ (US); Hsin-Ying Lee, San Jose, CA (US); Shervin Minaee, Bellevue, WA (US); Kyle Olszewski, Los Angeles, CA (US); Jian Ren, Hermosa Beach, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 200 days.

(21) Appl. No.: 17/957,312

(22) Filed: Sep. 30, 2022

(65) Prior Publication Data  
US 2023/0262293 A1 Aug. 17, 2023

Related U.S. Application Data

(60) Provisional application No. 63/309,720, filed on Feb. 14, 2022.

(51) Int. Cl.  
*H04N 21/472* (2011.01)  
*G06T 11/00* (2006.01)

(52) U.S. Cl.  
CPC ....... *H04N 21/47205* (2013.01); *G06T 11/00* (2013.01)

(58) Field of Classification Search  
CPC .................. H04N 21/47205; G06T 11/00  
See application file for complete search history.

(56) References Cited

U.S. PATENT DOCUMENTS

| 2015/0296228 A1* | 10/2015 | Chen | H04N 21/8126 725/34 |
| 2016/0014482 A1* | 1/2016 | Chen | H04N 21/8456 386/241 |
| 2023/0154188 A1* | 5/2023 | Li | G06V 10/776 382/159 |

FOREIGN PATENT DOCUMENTS

CN 113934890 A 1/2022

OTHER PUBLICATIONS

International Search Report and Written Opinion for International Application No. PCT/US2023/011921, dated May 23, 2023 (May 23, 2023)—10 pages.

(Continued)

*Primary Examiner* — Mishawn N. Hunter  
(74) *Attorney, Agent, or Firm* — CM Law; Stephen J. Weed

(57) ABSTRACT

A multimodal video generation framework (MMVID) that benefits from text and images provided jointly or separately as input. Quantized representations of videos are utilized with a bidirectional transformer with multiple modalities as inputs to predict a discrete video representation. A new video token trained with self-learning and an improved mask-prediction algorithm for sampling video tokens is used to improve video quality and consistency. Text augmentation is utilized to improve the robustness of the textual representation and diversity of generated videos. The framework incorporates various visual modalities, such as segmentation masks, drawings, and partially occluded images. In addition, the MMVID extracts visual information as suggested by a textual prompt.

20 Claims, 16 Drawing Sheets

(56) References Cited

OTHER PUBLICATIONS

Tsu-Jui Fu et al: "M3L: Language-based Video Editing via Multi-Modal Multi-Level Transformers", arxiv.org, Cornell University Library, Ithaca, NY, Apr. 2, 2021.
Zhu Zhang et al: "UFC-BERT: Unifying Multi-Modal Controls for Conditional Image Synthesis", arxiv.org, Aug. 18, 2021, XP081971665, pp. 3-7.

* cited by examiner

Algorithm 1 Improved Mask-Predict for Video Generation

Require: Initial PC mask $m_{PC}$ and initial token $z_{in}$.
1: $\tilde{P}, s \leftarrow \text{BERT}(Z_{in})$
2: $Z_{out}, y \leftarrow \text{SampleToken}(\tilde{p}, \sigma^{(1)})$
3: $Z_{out}, y \leftarrow m_{pc} \odot z_{in} + (1 - m_{pc}) \odot z_{out}$  ▷ PC
4: for $i \in \{2, ..., L\}$ do  ▷ main loop
5:    for $b \in \{1, ..., B\}$ do  ▷ beam search
6:       $m^b \leftarrow \text{SampleMask}(y, m_{pc}, N - n^{(i)})$
7:       $z_{in}^b \leftarrow m^b \odot z_{out} + (1 - m^b) \odot z_\phi$  ▷ remask
8:       $\tilde{p}^b, s^b \leftarrow \text{BERT}(z_{in}^b)$  ▷ repredict
9:    end for
10:   $b^* \leftarrow \arg\max_b(s^b)$
11:   $Z_{out}, y \leftarrow \text{SampleToken}(\tilde{p}^{b^*}, \sigma^{(i)})$
12: end for
13: return $z_{out}$

FIG. 7

| Condition | Methods | Shape | Color | Size | Motion | Dir | Avg |
|---|---|---|---|---|---|---|---|
| | Example A | 80.22 | 100.00 | 84.33 | 99.90 | 99.95 | 92.88 |
| Text Only | ART-V | 95.07 | 98.68 | 97.71 | 92.72 | 96.04 | 96.04 |
| | MMVID | 95.56 | 99.71 | 97.95 | 97.80 | 99.61 | 98.12 |
| Multimodal | ART-V | 92.82 | 97.17 | 97.31 | 89.55 | 93.99 | 94.17 |
| | MMVID | 98.19 | 99.76 | 98.83 | 99.46 | 99.95 | 99.24 |

FIG. 8

| Condition | Methods | Gender (%) ↑ | Expression (%) ↑ | IS ↑ |
|---|---|---|---|---|
| Text Only | Example B | - | - | *4.63 |
| | Example C | - | - | *4.92 |
| | Example D | - | - | *4.65 |
| | Example E | 99.22 | - | *5.34 |
| | ART-V | 93.46 | 100.00 | 5.53 |
| | | | 99.12 | 5.72 |
| | MMVID | 99.90 | 100.00 | 5.94 |
| Multimodal | ART-V | 89.16 | 98.54 | 5.59 |
| | MMVID | 98.14 | 100.00 | 5.85 |

FIG. 9

| Dataset | Methods | CLIP↑ | FVD↓ | $F_8$↑ | $F_{1/8}$↑ |
|---|---|---|---|---|---|
| iPER | ART-V | - | 277.604 | 0.936 | 0.806 |
| | MMVID | - | 209.127 | 0.944 | 0.924 |
| Multimodal VoxCeleb | ART-V | 0.193 | 60.342 | 0.953 | 0.960 |
| | MMVID | 0.197 | 46.763 | 0.972 | 0.971 |

FIG. 10

| Video Augmentation | | | | Accuracy (%) | | | | | |
|---|---|---|---|---|---|---|---|---|---|
| Swap | Shuffle | Color | Affine | Shape | Color | Size | Motion | Dir | Avg |
| X | X | X | X | 90.43 | 89.07 | 95.61 | 92.48 | 99.13 | 93.34 |
| ✓ | X | X | X | 91.02 | 89.84 | 93.75 | 91.02 | 98.05 | 92.73 |
| X | ✓ | X | X | 88.28 | 89.45 | 94.53 | 88.28 | 98.44 | 91.80 |
| X | X | ✓ | X | 91.80 | 91.02 | 94.53 | 93.36 | 98.83 | 93.91 |
| X | X | X | ✓ | 90.62 | 88.28 | 95.31 | 89.84 | 98.83 | 93.05 |
| ✓ | ✓ | ✓ | ✓ | 93.36 | 88.28 | 95.70 | 93.75 | 99.61 | 94.14 |

FIG. 11

VIDEO SYNTHESIS VIA MULTIMODAL CONDITIONING

CROSS-REFERENCE TO RELATED APPLICATIONS

This application claims priority to U.S. Provisional Application Ser. No. 63/309,720 filed on Feb. 14, 2022, the contents of which are incorporated fully herein by reference.

TECHNICAL FIELD

The present disclosure relates generally to image and video processing, including video synthesis.

BACKGROUND

Image and video synthesis are related areas that each generate content from noise. The focus of these areas includes image synthesis methods leading to image-based models capable of achieving improved resolutions and renderings, and wider variations in image content.

BRIEF DESCRIPTION OF THE DRAWINGS

The drawing figures depict one or more implementations, by way of example only, not by way of limitations. In the figures, like reference numerals refer to the same or similar elements.

FIG. 7 is pseudocode for an improved mask-predict algorithm;

FIG. 8 is a table illustrating classification accuracy on the Shapes dataset for video generation;

FIG. 9 is a table illustrating inception score and classification accuracy on MUG for video generation;

FIG. 10 is a table illustrating evaluation metrics for text-to-video generation on iPER and Multimodal VoxCeleb datasets;

FIG. 11 is a table illustrating analysis on Shapes for video augmentation strategies;

DETAILED DESCRIPTION

Figure 1:
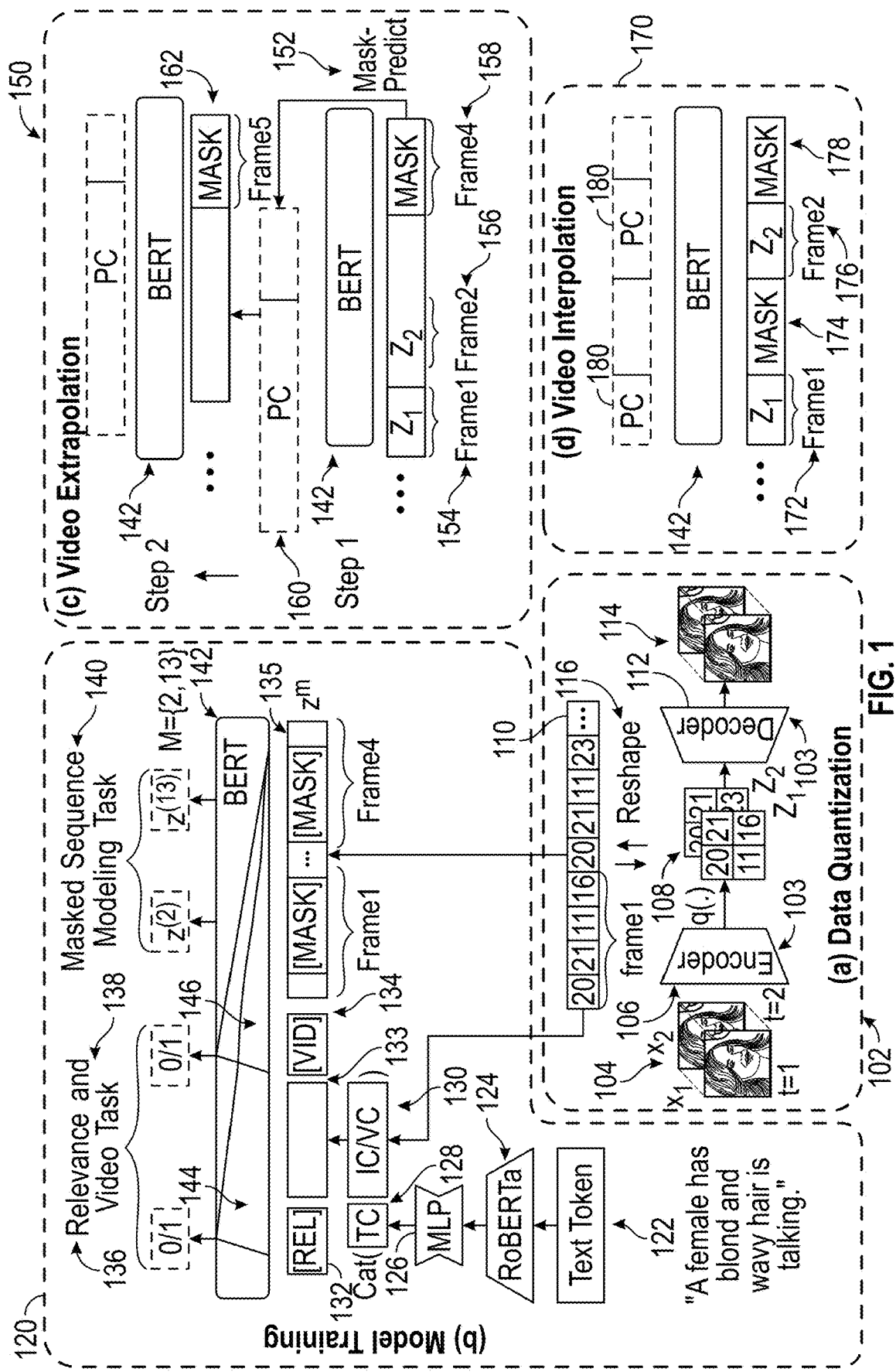
FIG. 1 is a block diagram illustrating a pipeline for training and inference of a multimodal video generator framework (MMVID)

The present disclosure includes a multimodal video generation framework (MMVID) that benefits from text and images provided jointly or separately as input. Quantized representations of videos are utilized with a bidirectional transformer with multiple modalities as inputs to predict a discrete video representation. A new video token trained with self-learning and an improved mask-prediction algorithm for sampling video tokens is used to improve video quality and consistency. Text augmentation is utilized to improve the robustness of the textual representation and diversity of generated videos. The MMVID incorporates various visual modalities, such as segmentation masks, drawings, and partially occluded images. In addition, the MMVID extracts visual information as suggested by a text prompt, e.g., "an object in image one is moving northeast", and then generates corresponding videos.

In this disclosure, conditional video synthesis is disclosed. It differs from existing methods since a more challenging problem is addressed: multimodal video generation. Instead of using a single modality, such as textual guidance, multiple modalities are used as inputs within a single framework for video generation. With multimodal controls, i.e., textual and visual inputs, two settings for video generation are further enhanced: independent and dependent multimodal inputs, in which various applications can be developed based on the framework. Unlike existing transformer-based video generation works that focus on autoregressive training, a non-autoregressive generation pipeline with a bidirectional transformer is applied.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

Existing works on conditional video generation use only one of the possible control signals as inputs. This limits the flexibility and quality of the generative process. For example, given a screenplay, several movies could be potentially generated, depending on the decisions of the director, set designer, and visual effect artist. In a similar way, a video generation model conditioned with a text prompt should be primed with different visual inputs. Additionally, a generative video model conditioned on a given image should be able to learn to generate various plausible videos, which can be defined from various natural language instructions. For example, to generate object-centric videos with objects moving, the motion can be easily defined using a text prompt, e.g., "moving in a zig-zag way," while the objects can be defined by visual inputs. A multimodal video generation model according to this disclosure achieves such behavior.

Experiments were conducted on four datasets. In addition to three public datasets, a new dataset was collected, named Multimodal VoxCeleb, that includes 19,522 videos from VoxCeleb with 36 manually labeled facial attributes.

FIG. 1 illustrates a pipeline for training and inference of a MMVID 100 for multimodal video generation. The pipeline includes data quantization 102, model training 120, video extrapolation 150, and video interpolation 170. Within a Bidirectional Encoder Representations from Transformers (BERT) module 142, a first triangle 144 and a second triangle 146 indicate the attention scopes of a relevance estimation (REL) task 136 and a video consistency estimation task 138, respectively. In view of the video extrapolation 150, each step represents a full mask-predict process 152 instead of a single forward pass of the transformer for simplicity.

The MMVID 100 has a processor 1202 (FIG. 12) that uses a two-stage image generation method with discrete feature representations. During a first stage, the data quantization 102, an autoencoder 103, with an encoder 106 and a decoder 112, is trained. The autoencoder 103 has an architecture obtaining a quantized representation 108 for images. Given a real video clip 104 defined as $v=\{x_1, x_2, \ldots, x_T\}$ with $x_t \in \mathbb{R}^{H \times W \times 3}$, the quantized representation 108 of the real video 104 clip defined as $z=\{z_1, z_2, \ldots, z_T\}$ is obtained, where $z_t = q(E(x_t)) \in \mathbb{N}_1^{h \times w}$. The operator $q(\cdot)$ denotes the quantization operation and $\mathbb{N}_1$ indicates a set of positive integers.

During a second stage, model training 120 is learned using BERT module 142 for modeling a correlation between multimodal controls, namely, text control (TC) 128 and image/video control (IC/VC) 130, and the learned vector quantization representation 108 of video 104. Specifically, the tokens are concatenated from the multimodal inputs 128 and 130 and the target video 114 as a sequence to train the BERT module 142. Tensors obtained from the image and video 104 are vectorized for concatenation. This is done by using a reshape operation 116 (Reshape). Therefore, the video tensor z 108 is reshaped into a single-index tensor 110 as Reshape(z)=$[z^{(1)}, \ldots, z^{(hwT)}]$. For simplicity of notation, it is defined z≡Reshape(z). To train the non-autoregressive BERT module 142 on video tokens, three tasks are employed: Masked Sequence Modeling (MSM) 140, REL 136, and Video consistency estimation (VID) 138. During inference, samples are generated via an iterative algorithm, shown as Algorithm 1 in FIG. 7, based on mask-predict 152, which is simulated by the MSM 140 task during training. The REL 136 and VID 138 tasks regularize the model to synthesize videos that are relevant to the multimodal signals and are temporally consistent. Each task is now described in further detail.

Masked Sequence Modeling with Relevance

Figure 4:
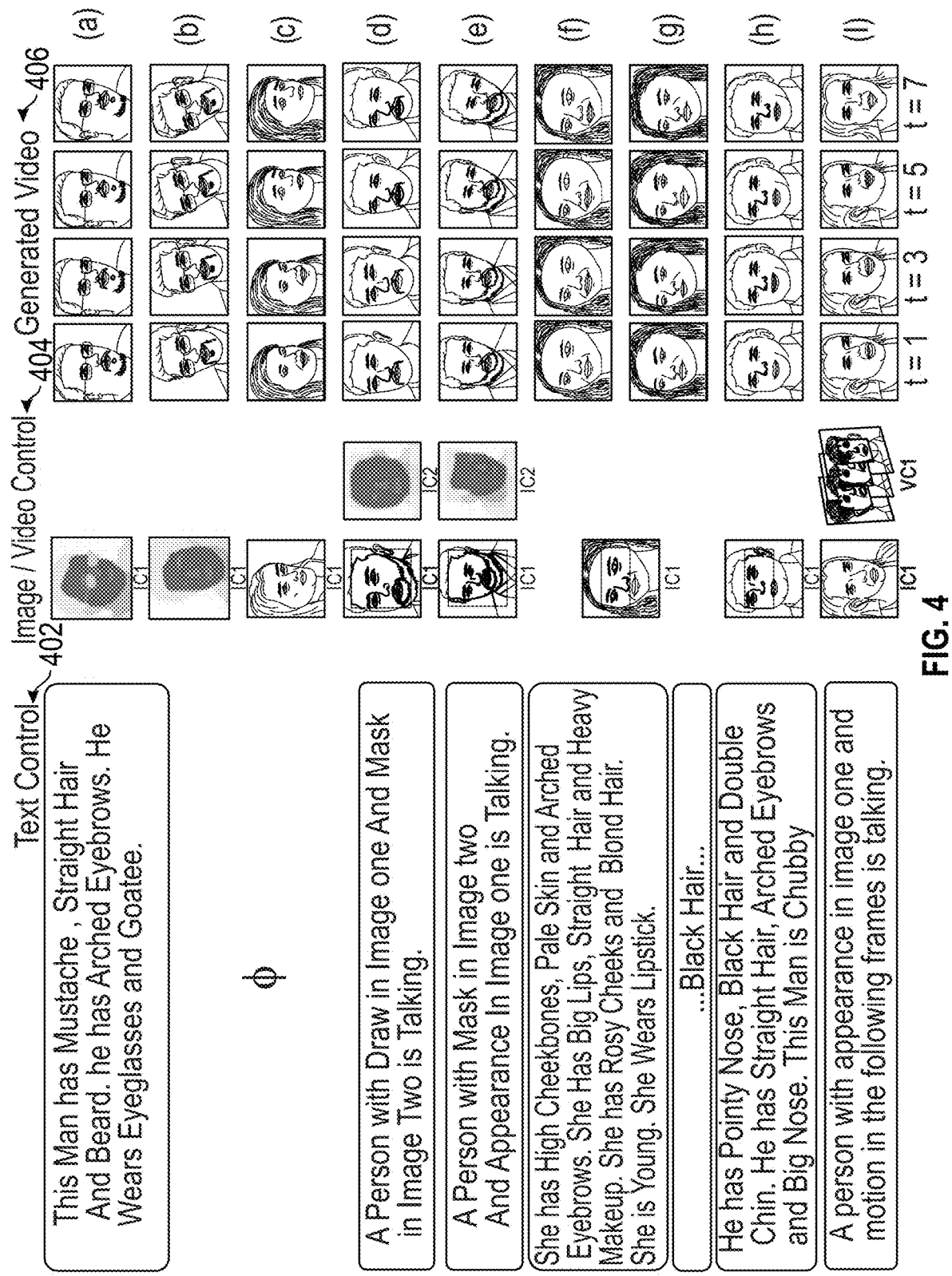
FIG. 4 is a table including a series of images illustrating independent and dependent generation results from MMVID on Multimodal VoxCeleb with textual control, image control, and video control.
Figure 5:
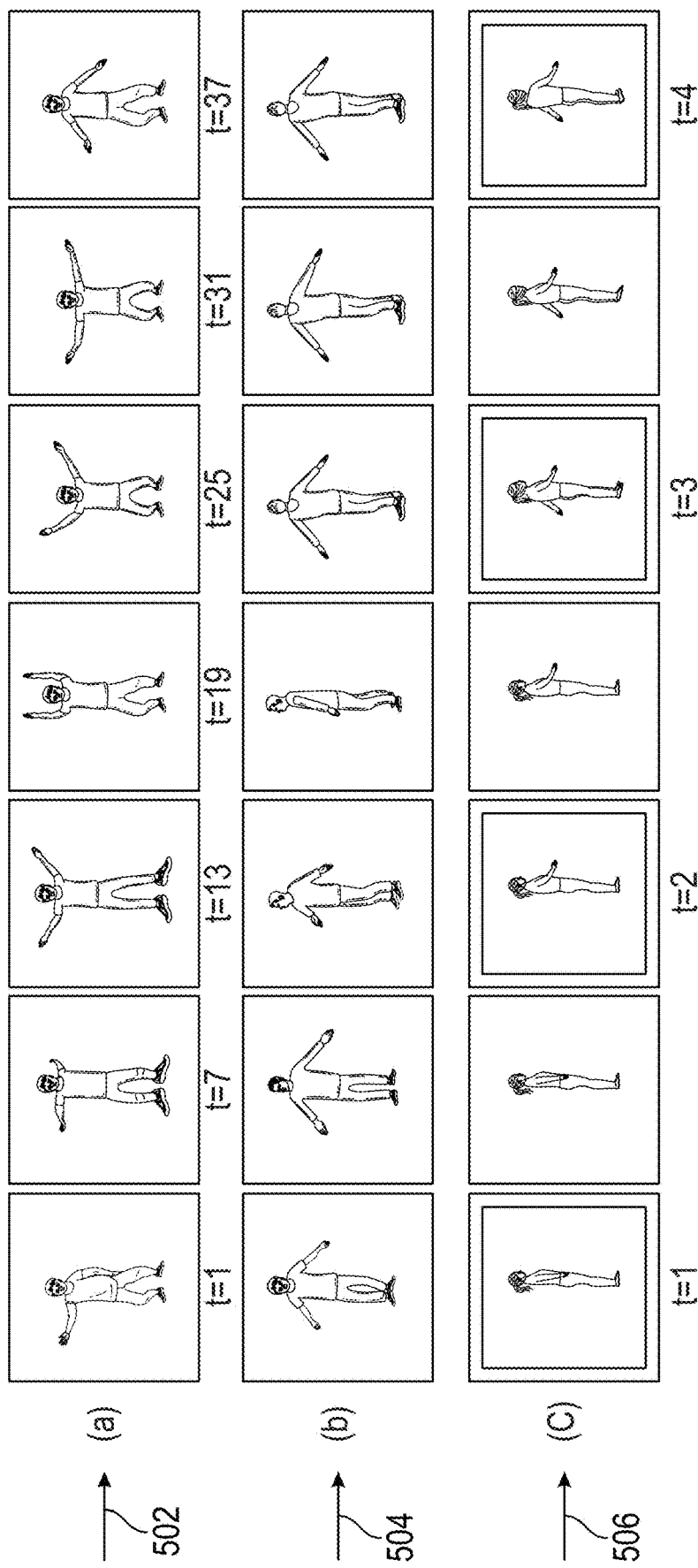
FIG. 5 is a series of images illustrating extrapolation and interpolation results from MMVID.
Figure 5:
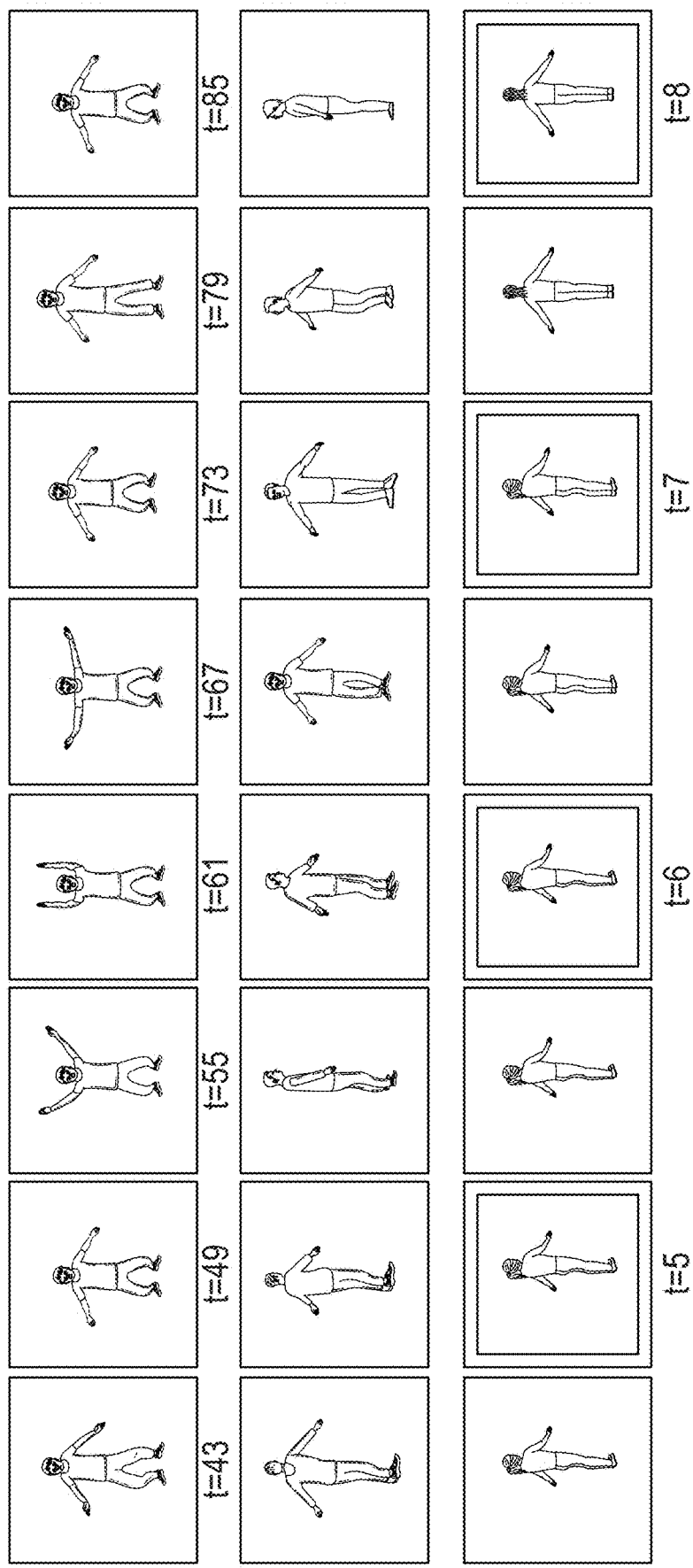

The MSM 140 is similar to a conditional masked language model. The non-autoregressive model learns bidirectional representations and enable parallel generation (mask-predict 152). Five suitable masking strategies are: (I) i.i.d. masking, i.e., randomly masking video tokens according to a Bernoulli distribution; (II) masking all tokens; (III) block masking, which masks continuous tokens inside spatio-temporal blocks; (IV) the negation of block masking, which preserves the spatio-temporal block and masks the rest of the tokens; and (V) randomly keeping some frames (optional). Strategies I and II are designed to simulate mask-predict sampling (the strategy chosen for the majority of the time). Strategy II helps the MMVID 100 learn to generate from a fully masked sequence in the first step of mask-predict 152. Strategies III-V can be used as Preservation Control (PC) 160 and 180 for preservation tasks, which enable the use of partial images as input (FIG. 3A and FIG. 4) and performing long sequence generation (FIG. 5). The MSM 140 minimizes the softmax cross-entropy loss $\mathcal{L}_{MSM}$ by the following equation ("Equation 1"):

$$\mathcal{L}_{MSM} = -\frac{1}{|\mathcal{M}|} \sum_{i \in \mathcal{M}} \log P(z^{(i)} | z^m, c)$$

where $\mathcal{M}$ is the masking indices, $z^m$ is the masked sequence, and c denotes the control sequence.

To encourage the BERT module 142 to learn the correlation between multimodal inputs 128 and 130 and target videos 114, a special token REL 132 is prepended to the whole sequence, and a binary classifier is learned to classify positive and negative sequences. The positive sequence is the same as the sequence used in the MSM 140 so that the same BERT module 142 is reused in the forward pass. The negative sequence is constructed by swapping the condition signals along the batch dimension. This swapping does not guarantee constructing strictly negative samples. Nevertheless, it is adequate to make the MMVID 100 learn relevance in practice. The loss function $\mathcal{L}_{REL}$ for the REL task 136 is given by the following equation ("Equation 2"):

$$\mathcal{L}_{REL} = -\log P(1|z^m, \bar{c}) - \log P(0|z^m, \bar{c})$$

where $\bar{c}$ denotes the swapped control sequence.

Video Consistency Estimation

To further regularize the MMVID 100 to generate temporally consistent videos, the video consistency estimation task 138 is used. Similar to REL 132, a special token VID 134, which is trained via self-learning and video attention, is used to classify positive and negative sequences.

The VID task 138 focuses on video token sequences. The VID 134 token is positioned between a control sequence 133 and target sequences 135. A mask is applied to BERT module 142 to blind the scope of the VID token 134 from the control signals 128 and 130 so it only calculates attention from the tokens of the target videos 114. The positive sequence is the same one used in MSM 140 and REL 136 tasks. The negative sequence is obtained by performing negative augmentation on videos to construct samples that do not have temporally consistent motion or content.

Four strategies are employed to augment negative video sequences: (I)frame swapping—a random frame is replaced by using a frame from another video; (II)frame shuffling—frames within a sequence are shuffled; (III) color jittering—randomly changing the color of one frame; (IV) affine transform—randomly applying an affine transformation on one frame. All augmentations are performed in image space. With 2 denoting the video sequence after augmentation, the loss $\mathcal{L}_{VID}$ for the VID task 138 is given by the following equation ("Equation 3"):

$$\mathcal{L}_{VID} = -\log P(1|z^m, c) - \log P(0|\tilde{z}^m, c)$$

Overall, the full objective is $\mathcal{L}_{VID} = \lambda_{MSM}\mathcal{L}_{MSM} + \lambda_{REL}\mathcal{L}_{REL} + \lambda_{VID}\mathcal{L}_{VID}$, where $\lambda$s balances the losses.

Improved Mask-Predict for Video Generation

Mask-predict 152 is employed during inference, which iteratively remasks and repredicts low-confidence tokens by starting from a fully-masked sequence. Mask-predict 152 is selected because it can be used with the BERT module 142, as the length of the target sequence 135 is fixed. In addition, mask predict 152 provides several benefits. First, it allows efficient parallel sampling of tokens in a sequence. Second, the unrolling iterations from mask-predict 152 enable direct optimization on synthesized samples, which can reduce exposure bias. Third, information comes from both directions, which makes the generated videos more consistent.

Text Augmentation

Figure 6:
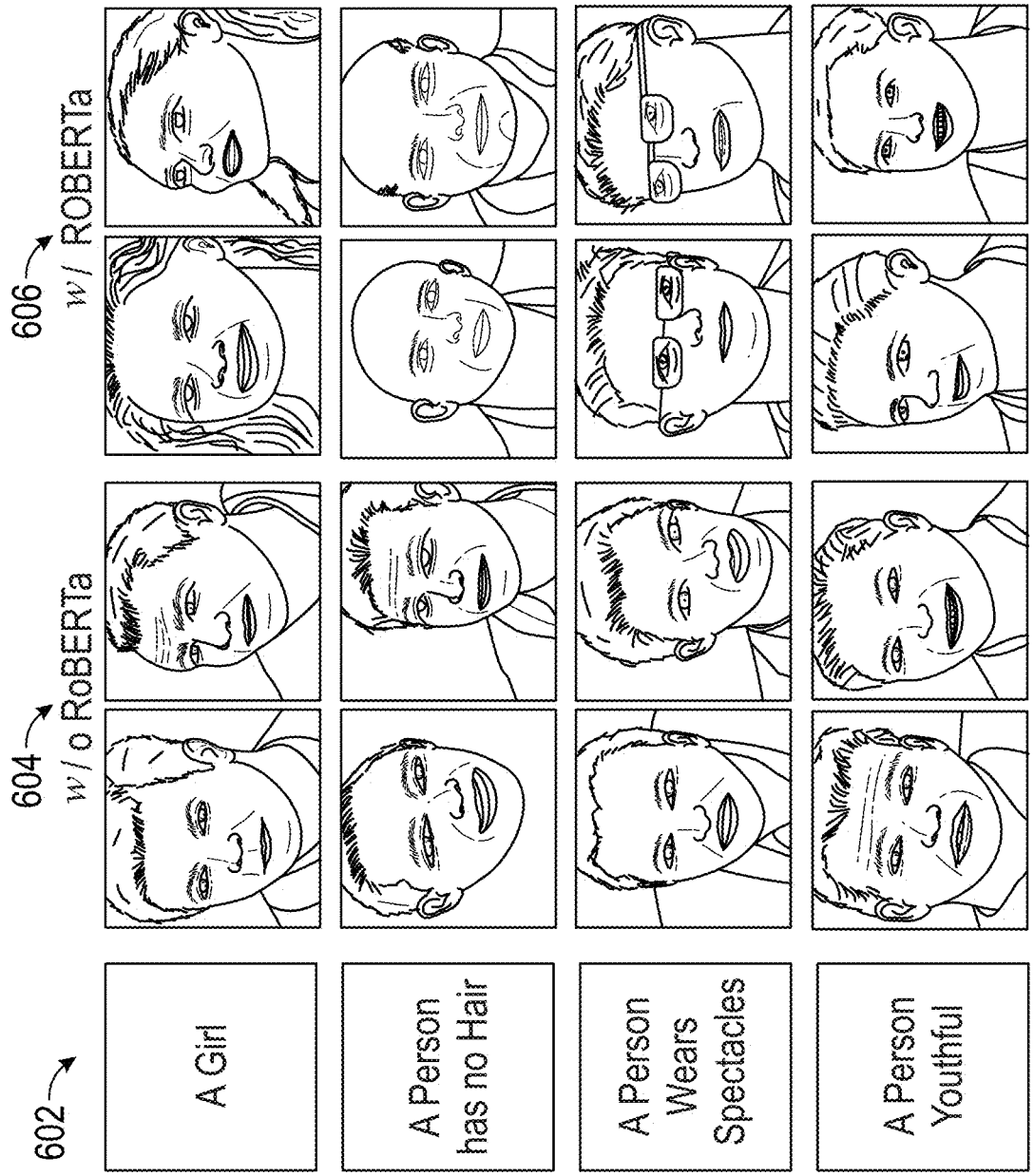
FIG. 6 is a series of images illustrating analysis on language embedding.

A text augmentation is used, including text dropout and pretrained language models for extracting textual embeddings, to generate diverse videos that are correlated with the provided text. Two suitable augmentation methods are now described. In a first, sentences were randomly dropped from the input text 122 to avoid the memorization of certain word combinations. In a second, a fixed pretrained language model, i.e., RoBERTa 124, is applied rather than learning text token embeddings in a lookup table from scratch, to let the MMVID 100 be more robust for input textual information. The features of text tokens are obtained from an additional multilayer perceptron (MLP) 126 appended after the language model that matches the vector dimension with BERT module 142. The features are converted to a weighted sum to get the final embedding of the input text 122. With the language model, the MMVID 100 is more robust for out-of-distribution text prompts. When using the tokenizer, it can be observed that a common root may be useful to handle synonyms as shown in FIG. 6.

Long Sequence Generation

Due to the inherent preservation control mechanism during training (strategy V in the MSM 140), sequences can be generated with many more frames than the MMVID 100 is trained with via interpolation 170 or extrapolation 150. Interpolation 170 is conducted by generating intermediate frames, 174 and 178, between given frames, 172 and 176. As illustrated by 170 of FIG. 1, $z_1$ and $Z_2$ are placed at the positions of frame 1 172 and frame 3 176 to serve as preservation controls 180, i.e., they are kept the same during mask-predict 152 iterations, and the intermediate frame 174 can be interpolated between them. Extrapolation 150 is similar to interpolation 170, except the model is conditioned on previous frames, 154 and 156, to generate the next frames 158 or 162. As illustrated at 150 of FIG. 1, this process can be iterated a number of times to generate minute-long videos.

Experiments are shown on the following datasets: Swarm Heuristics Based Adaptive and Penalized Estimation of Splines (SHAPES), MUG, impersonator (iPER), and Multimodal VoxCeleb. SHAPES is shown in Example A (FIG. 2A) for text-to-video generation. Each video shows one object (a geometric shape with specified color and size) displayed in a textured moving background. The motion of an object is described by a text and the background is moving in a random way. There are 30K videos with size 64×64. MUG contains 52 actors performing 6 different facial expressions. Gender labels are provided for the actors. For a fair comparison, text descriptions were obtained by following Example E (FIG. 9). Experiments were run on 1039 videos with resolution 128×128. iPER consists of 206 videos of 30 subjects wearing different clothes performing an A-pose and random actions. Experiments were conducted with size 128×128. Multimodal VoxCeleb is a new dataset for multimodal video generation. First, 19,522 videos were obtained from VoxCeleb after performing pre-processing. Second, 36 facial attributes were manually labeled and described in CelebA for each video. Third, a probabilistic context-free grammar was used to generate language descriptions. Finally, the application APDrawingGAN was run to get artistic portrait drawings and utilize face-parsing to produce segmentation masks.

Baseline Methods. Example A was run on Shapes, MUG, and Multimodal VoxCeleb datasets for comparison of text-to-video synthesis. The MMVID 100 is compared with Example E on MUG. Additionally, the autoregressive transformer is unified with the autoencoder in a multimodal video generative model. The strong baseline is named as AutoRegressive Transformer for Video generation (ART-V) and compared the BERT module 142 for predicting video tokens. ART-V was trained with the next-token-prediction objective on concatenated token sequences obtained from input controls and target videos.

Evaluation Metrics. The metrics from existing works on SHAPES and MUG is followed to get a fair comparison. Specifically, classification accuracy is computed on SHAPES and MUG and Inception Score (IS) on MUG. On Multimodal VoxCeleb and iPER datasets, Fre'chet Video Distances (FVD) that is computed from 2048 samples and Precision-Recall Distribution (PRD) ($F_8$ and $F_{1/8}$) is reported for diversity. The Contrastive Language-Image Pre-training (CLIP) score for calculating the cosine similarity between textual inputs and the generated videos on Multimodal VoxCeleb is additionally reported.

Figure 2A:
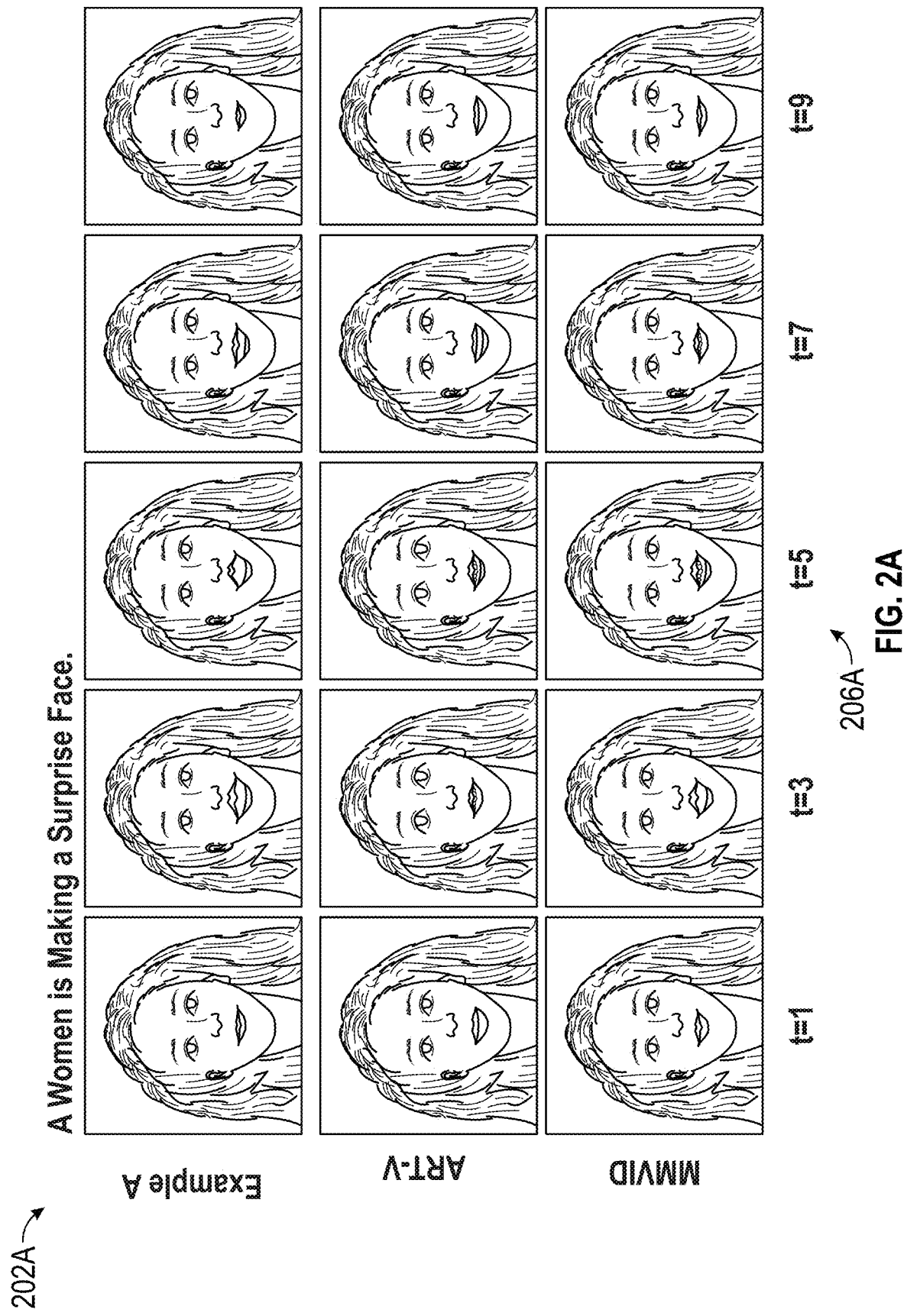
FIG. 2A is a series of images illustrating text-to-video generation results from MMVID, AutoRegressive Transformer for Video generation (ART-V), and an example (Example A) of a multimodal functional unification grammar (MUG) dataset.
Figure 2B:
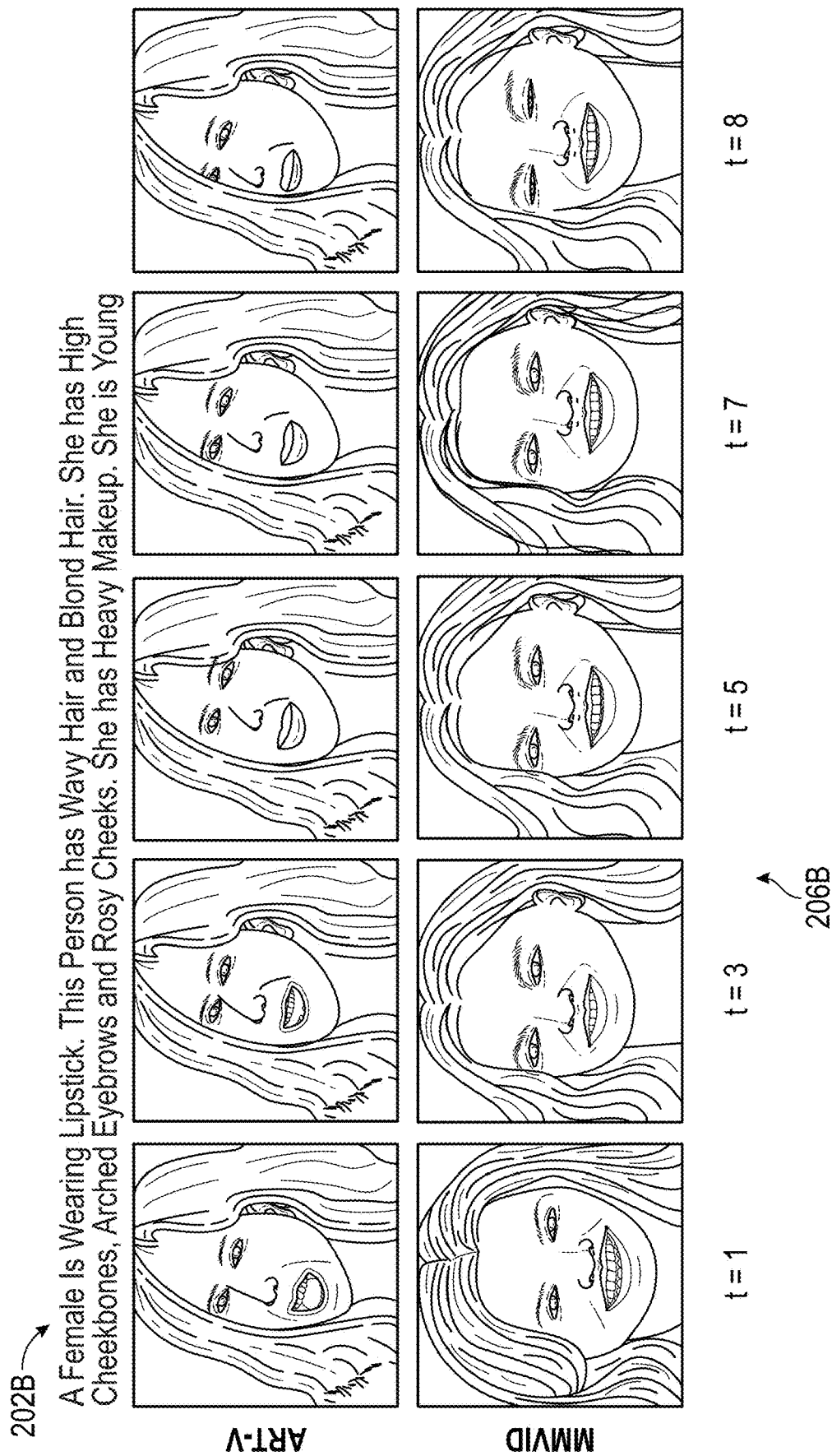
FIG. 2B is a series of images illustrating text-to-video generation results from MMVID and ART-V on a Multimodal VoxCeleb dataset.

FIG. 2A and FIG. 2B illustrate text-to-video generation results for different methods. Sample frames 206A-B are shown at several time steps (t). Conditioned text 202A-B is provided at the top of each figure. FIG. 2A shows sample results on a MUG dataset. ART-V and MMVID 100 generate sharp and temporally consistent videos while frames produced by Example A are blurry. FIG. 2B shows sample results on Multimodal VoxCeleb. The frame generated by ART-V at t=1 is sharp and clear, while frames at later steps such as t=5 or t=8 are blurry when compared to frames generated by MMVID 100.

Figure 3A:
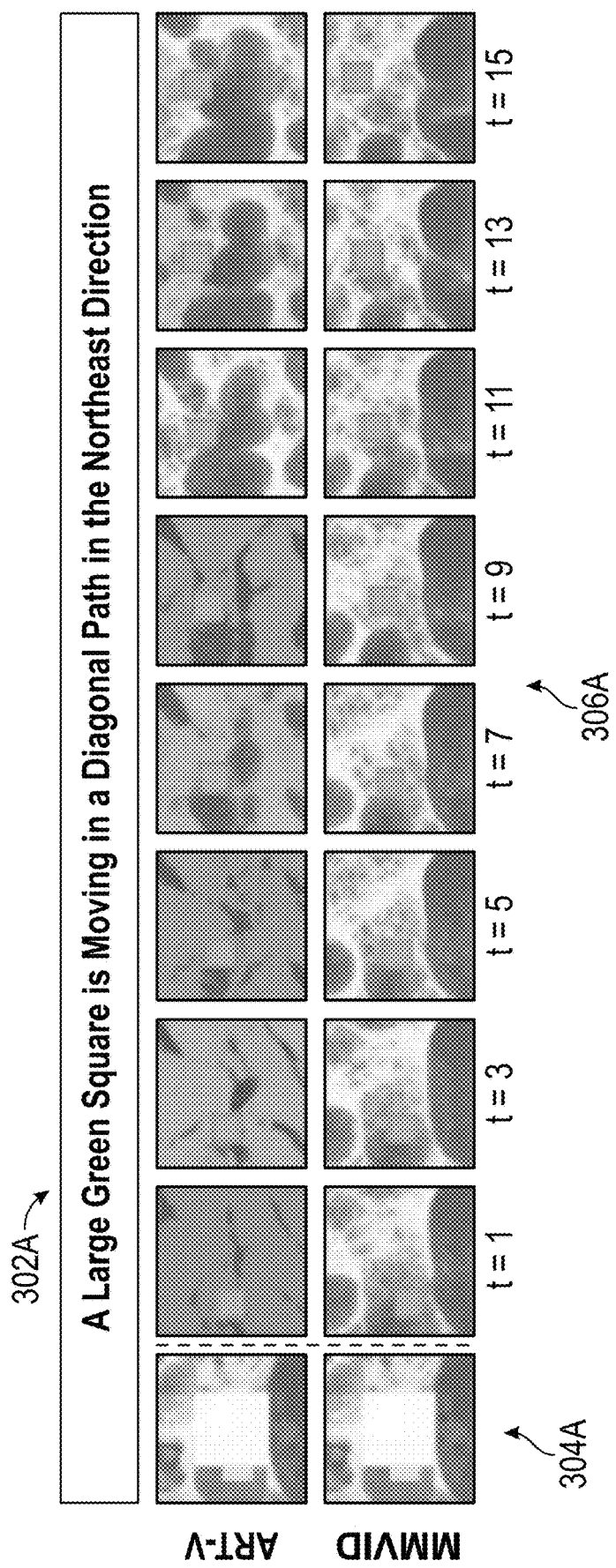
FIG. 3A is a series of images illustrating sample results from independent multimodal control of MMVID and ART-V on a Shapes dataset.

A user can show the MMVID 100 what to generate using visual modalities and tell how to generate with language. Two settings for multimodal video generation are explored. The first setting involves independent multimodalities, such that there is no relationship between textual controls and visual controls (FIG. 3A and FIG. 4). The second setting targets dependent multimodal generation, where text is used to obtain certain attributes from given visual controls (FIG. 3B and FIG. 4).

Figure 3B:
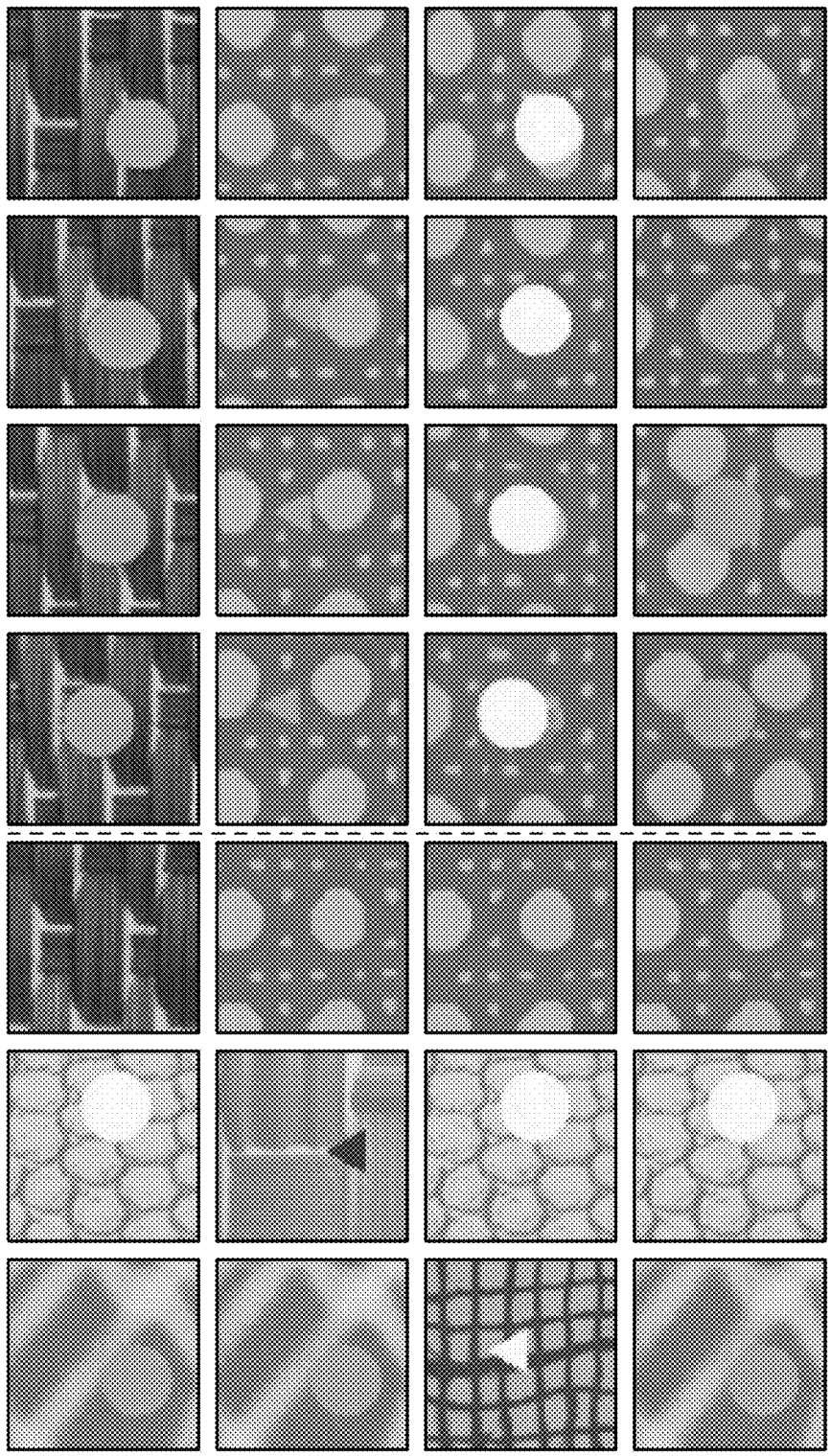
FIG. 3B is a series of images illustrating sample results from dependent multimodal control of MMVID on the Shapes dataset.

FIGS. 3A and 3B illustrate multimodal generation results of MMVID 100 on Shapes with textual modalities 302A-B and visual modalities 304A-B. Sample frames 306A-B are shown at several time step (t). FIG. 3A illustrates the result of independent multimodal control of the MMVID 100. The text description 302A specifies the size, color, and shape of the object, and its motion. The visual control 304A is a partially observed image with its center masked out (shown as white), which provides control for the background. ART-V can generate correct object and motion, but it suffers from incorporating consistent visual inputs such that the background is not temporal consistent. FIG. 3B illustrates dependent multimodal controls. The text description 302B specifies from which image 304B to extract color, shape, and background. The latter case allows for more potential applications, in which language is not able to accurately describe certain image content that the user seeks to generate, but images can efficiently define such content. It is also shown that the MMVID 100 can use diverse visual information, including segmentation masks, drawings, and partially observed images (FIG. 4).

FIG. 4 illustrates independent and dependent multimodal video generation of MMVID 100 on Multimodal VoxCeleb with textual control (TC) 402, image control (IC) 404, and video control (VC) 404. The following trials were run: Row (a)-(b): TC+IC are segmentation mask; Row (c): TC (null)+IC is a drawing; Row (d)-(e): dependent TC+IC; Row (f)-(h): TC+IC (partial image) and the TC of (g) is obtained from the TC of (f) by replacing "blond" with "black"; Row (i): dependent TC+VC and the VC includes content and motion information.

FIG. 5 illustrates the use of MMVID 100 for extrapolation and interpolation. Row 502-504: long sequence generation via extrapolation. Row 506: interpolating a real sequence. Frames in bold outlined boxes are fixed as preservation control. Textual controls for each row are: (a) 502 "Person 024 dressed in 2 is performing random pose, normal speed."; (b) 504 "Person 024 dressed in 1 is performing A-pose, normal speed."; and (c) 506 "Person 028 dressed in 2 is performing A-pose, normal speed."

FIG. 6 illustrates analysis on language embedding. Samples are generated with out-of-distribution textual inputs 602. The original text (strikethrough) is reworded with equivalent descriptions (italic) that do not exist in the training. The first frames from the generated sequences are shown for each method 604 and 606. Frames generated using the pretrained language model (w/RoBERTa) 604 is more correlated with text inputs than frames generated without using the pretrained language model (w/o RoBERTa) 606.

FIG. 7 illustrates the sampling algorithm, Algorithm 1. The sampling algorithm is built based on an original mask-predict with two improvements: (I) noise-annealing multinomial sampling, i.e., adding noise during remasking; (II) a new scheme for mask annealing, i.e., using a piecewise linear annealing scheme to prevent the generated motion from being washed out after too many steps of mask-predict 152. A beam search is also applied. In Algorithm 1, the BERT module 142 takes input tokens zin and outputs score s and the logits $\hat{p}$ for all target tokens. At each mask-predict iteration, tokens are sampled with SampleToken that returns a predicted token $z_{out}$ and a vector y containing its probabilities (unnormalized). SampleToken also accepts a scalar σ that indicates the noise level to be added during the token sampling process. SampleMask(y, m, N-n) remasks n tokens from a total of N tokens according to the multinomial defined by the normalized y, while ensuring tokens with m=1 are always preserved. $z_\phi$ denotes the fully-masked sequence.

FIG. 8 illustrates the classification accuracy (%) on the SHAPES dataset for video generation. MMVID 100 achieves the best performance.

FIG. 9 illustrates Inception Score (IS) and classification accuracy (%) on MUG for video generation. The mark '*' is used to indicate IS values reported in Example E. MMVID 100 achieves the highest accuracy and IS.

FIG. 10 illustrates the evaluation metrics for text-to-video generation on iPER and Multimodal VoxCeleb datasets.

FIG. 11 illustrates the analysis on SHAPES for video augmentation strategies.

Text-to-Video Generation

SHAPES. The classification accuracy is reported in FIG. 8 (top four rows) for the SHAPES dataset. ART-V and MMVID 100 are trained for 100K iterations. Compared with Example A, the MMVID 100 achieves significantly higher classification accuracy for Shape, Size, and Average (Avg) categories. Compared with ART-V, the MMVID 100 performs better in all the categories. Note that the MMVID 100 has slightly lower accuracy on Color, Motion, and Direction (Dir) than Example A. Note that to have a fair comparison, text augmentation is not applied when performing comparison with other examples.

MUG. The experimental setup in Example E is followed for experiments on the MUG expression dataset. Models are trained with a temporal step size of 8 due to the memory limit of GPU. Note Example E is trained with a step size of 4 and generates 16-frame videos, while the MMVID 100 generates 8-frame videos in a single forward. A 3D ConvNet is also trained as described in Example E to evaluate the Inception Score and perform classification on Gender and Expression. Results are shown in FIG. 2A and FIG. 9 (top 8 rows). The MMVID 100 achieves the best performance.

iPER. The results of the dataset are shown in FIG. 10 (top 3 rows), which demonstrate the advantages of MMVID 100 over ART-V. Long sequence generation results are shown in FIG. 5.

Multimodal VoxCeleb. ART-V and the MMVID 100 are trained at a spatial resolution of 128×128 and a temporal step of 4 to generate 8 frames. The MMVID 100 shows better results than ART-V on all the metrics, as shown in FIG. 10 (bottom two rows). It is shown that ART-V can also generate video samples with good visual quality and are aligned well with the text descriptions. However, ART-V often produces samples that are not temporally consistent. For example, as shown in FIG. 2B, the frame generated by ART-V at t=1 is sharp and clear, but frames at t=5 or t=8 are blurry. Due to bidirectional information during training and inference, the MMVID 100 is able to produce temporally consistent videos. Example A is also trained at a spatial resolution of 64×64.

Multimodal Video Generation.

Multimodal conditions can evolve in two cases: independent and dependent, and experiments are shown on both.

Independent Multimodal Controls. This setting is similar to conventional conditional video generation, except the condition is changed to multimodal controls. Experiments are conducted on SHAPES and MUG datasets with the input condition as the combination of text and image. The bottom two rows in FIG. 8 and FIG. 9 demonstrate the advantages of the MMVID 100 over ART-V on all metrics. Additionally, generated samples are provided in FIG. 3A, where only a partial image is given as the visual condition. As can be seen, ART-V cannot satisfy the visual constraint well and the generated video is not consistent. The quality degradation for multimodal video synthesis of ART-V is also verified in FIG. 8 as it shows lower classification accuracy than text-only generation, while the MMVID 100 is able to generate high quality videos for different condition signals. Extensive experiments of video generation under various combinations of textual controls 402 and image controls 404 are also conducted on Multimodal VoxCeleb, as shown in FIG. 4. Three different image controls 404 are applied, including segmentation mask (FIG. 4 row (a)-(b)), drawing (FIG. 4 row (c)-(d)), and partial image (FIG. 4 row (d)-(f)). In FIG. 4 row (b), the MMVID 100 can synthesize frames with eyeglasses even though eyeglasses are not shown in segmentation mask. In FIG. 4 row (f)-(g), it is shown that using the same image control 404 while replacing the "blond" with "black" in the text description 402, frames can be generated with similar content except the hair color is changed. Such examples demonstrate that the MMVID 100 has a good understanding of multimodal controls.

Dependent Multimodal Controls. Furthermore, a novel task for multimodal video generation is introduced where textual controls and visual controls are dependent, such that the actual control signals are guided by the textual description. For example, FIG. 3B illustrates how the text control 302B informs from which image 304B the model queries color, shape, and background information. More synthesized examples on Multimodal VoxCeleb are given in FIG. 4. For FIG. 4 row (d)-(e), the MMVID 100 learns to combine detailed facial features from drawing or image and coarse features (i.e., pose) from mask. For FIG. 4 row (i), the MMVID 100 successfully retargets the subject with an appearance from the given image control 404 (IC1) and generates frames 406 with the motion specified by consecutive images that provide motion control (VC1).

Long Sequence Generation and Ablation

FIG. 5 illustrates long sequence generation. The MMVID 100 approach enables the generation of minutes-long videos. Samples of video extrapolation 502 and 504 and interpolation 506 are shown in FIG. 5. Samples from FIG. 5 (a) 502-(b) 504 are generated by being iteratively conditioned on previous 6 frames to generate the following 2 frames. FIG. 5 row (c) 506 shows an example of synthesizing one frame by interpolating two consecutive real frames. Long sequence synthesis is explored with the transformer model to generate sequences with lengths that are much longer than the one used for training.

Analysis on VID Task. Analysis is performed for different VID strategies on the SHAPES dataset. FIG. 11 shows that the highest average accuracy is achieved when all augmentation is used (sampled uniformly). Also note that accuracy for color is the highest when only color augmentation is applied.

Analysis on Language Embedding. Analysis of using a pretrained language model is shown in FIG. 6. MMVID 100 with a language model (w/RoBERTa 124) 604 is more robust to various text inputs than the one without it (w/o RoBERTa 124) 606.

This disclosure targets a new problem, which is video generation using multimodal inputs. A two-stage video generation framework MMVID 100 is used that includes an autoencoder 103 for quantized representation of images and videos, and a non-autoregressive transformer (e.g., the BERT module 142) for predicting video tokens 128 and 130 from multimodal input signals, is utilized. Several techniques are disclosed, including the special VID token 134, textual embedding, and improved mask prediction 152, to help generate temporally consistent videos. Using the MMVID 100, various applications can be built, such as video interpolation and extrapolation for long sequence generation, and dependent multimodal generation with various visual controls.

Figure 12:
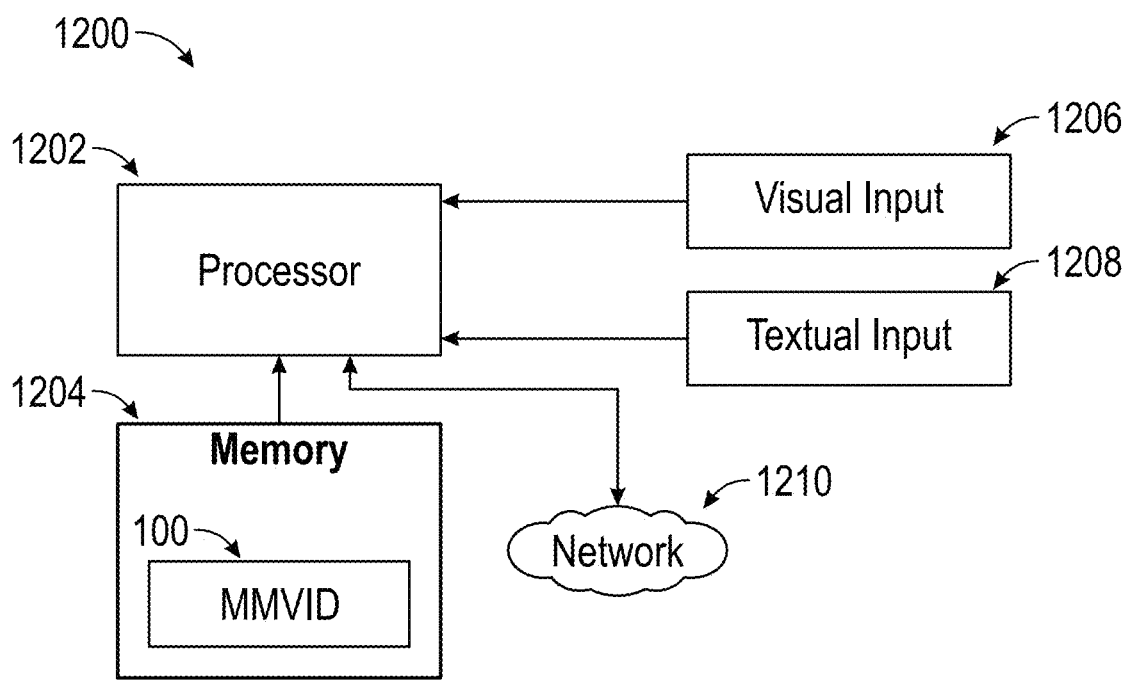
FIG. 12 is a block diagram of a system equipped with MMVID.

FIG. 12 illustrates an example of a system 1200 that is equipped with the MMVID 100. A processor 1202 is coupled to a memory 1204 (e.g., a non-transitory computer readable storage medium) and is configured to perform the tasks of MMVID 100 using the visual input 1206 and the textual input 1208. The memory 1204 of the system 1200 stores the code comprising instructions executable by the processor 1202 for the video generation framework MMVID 100. The processor 1202 is connected to a network 1210, such as the internet, to send data, generated video, or other information. The processor 1202 is configured to receive additional instructions from the network 1210.

Figure 13A:
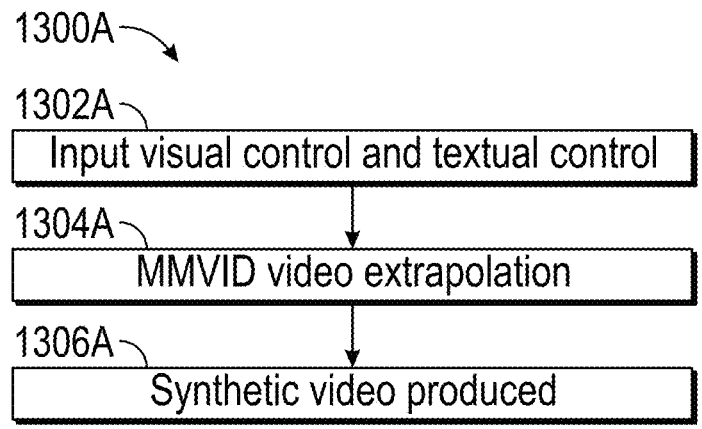
FIGS. 13A and 13B are flow charts of methods of generating a video with MMVID.
Figure 13B:
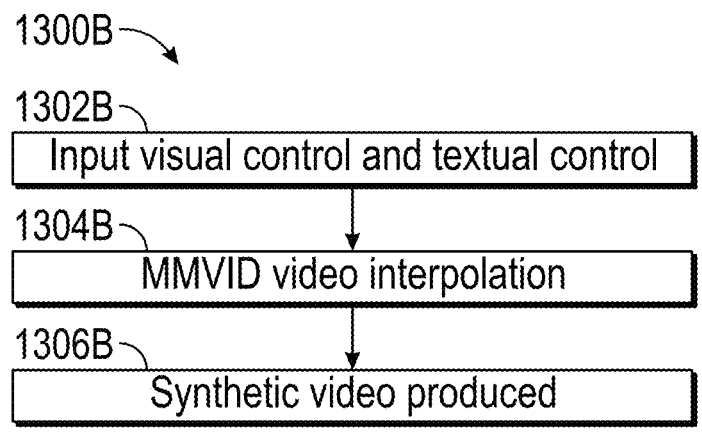

FIG. 13A and FIG. 13B illustrates methods of producing video with the MMVID 100 using multimodal inputs.

FIG. 13A illustrates a method 1300A performed by processor 1202 executing instructions of memory 1204 performing video via extrapolation. At block 1302A, the processor 1202 receives a visual input and a textual input as the input for the MMVID 100. The visual input and textual input can be received directly from a user using a graphical user interface (GUI) presented on a display, as scanned images, and from memory. Examples of visual input are an image, a plurality of images, videos, drawings, picture segmentation masks, partially observed images, or other similar visual cues. Examples of textual inputs include descriptions of an object or person, actions, movements, prompts, or other similar textual cues.

At block 1304A, the processor 1202 of MMVID 100 processes the multimodal inputs via the encoder 103 for the visual input and a text augmentation system including text token 122, RoBERTa 124, and MLP 126 as shown in FIG. 1. The processor 1202 then uses the video extrapolation 150 to iteratively generate a synthetic video.

At block 1306A, the processor 1202 generates a synthetic video based on the multimodal inputs. The MMVID 100 incorporates various visual modalities, such as segmentation masks, drawings, and partially occluded images. In addition, the MMVID extracts visual information as suggested by a textual prompt. For example, FIG. 13B illustrates a method 1300B performed by processor 1202 executing instructions of memory 1204 performing video via interpolation. At block 1302B, the processor 1202 receives a visual input and a textual input as the input for the MMVID 100. The visual input and textual input can be received directly from a user using a graphical user interface (GUI) presented on a display, as scanned images, and from memory. Examples of visual input are images, a plurality of images, videos, drawings, picture segmentation masks, partially observed images, or other similar visual cues. Examples of textual inputs include descriptions of an object or person, actions, movements, prompts, or other similar textual cues.

At step 1304B, the processor 1202 of MMVID 100 processes the multimodal inputs via the encoder 103 for the visual input and a text augmentation system including text token 122, RoBERTa 124, and MLP 126. The processor 1202 then uses the video interpolation 170 to insert synthetic frames between real frames to generate a synthetic video based on the multimodal inputs.

At step 1306B, the processor 1202 generates a synthetic video. The MMVID 100 incorporates various visual modalities, such as segmentation masks, drawings, and partially occluded images. In addition, the MMVID extracts visual information as suggested by a textual prompt.

In the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A conditional video synthesis method, the method comprising:
    accessing a multimodal video generation framework (MMVID) comprising a pretrained autoencoder, a language model, a mask-predict algorithm, and a pretrained bidirectional transformer;
    receiving multimodal input signals; and
    generating a video by applying the MMVID to the multimodal input signals.

2. The method of claim 1, wherein the multimodal input signals comprise a visual control and a textual control.

3. The method of claim 2, wherein the MMVID is a two-stage video generation framework comprising a first stage and a second stage, the method further comprising:
    quantizing the visual control in the first stage using the pretrained autoencoder; and
    predicting a video token in the second stage from the multimodal input signals using the pretrained bidirectional transformer.

4. The method of claim 3, wherein the pretrained autoencoder comprises an encoder and a decoder and wherein the method further comprises obtaining a quantized representation of images using the pretrained autoencoder.

5. The method of claim 4, wherein the pretrained bidirectional transformer is non-autoregressive.

6. The method of claim 5, further comprising:
    pretraining a bidirectional transformer on video tokens by a masked sequence estimation, a relevance estimation, and a video estimation to generate the pretrained bidirectional transformer.

7. The method of claim 1, wherein textual control and visual control are produced by text augmentation of input text by the language model.

8. The method of claim 7, wherein the textual control and the visual control are independent.

9. The method of claim 7, wherein the textual control and the visual control are dependent and wherein the MMVID extracts visual information from the visual control as suggested by the textual control.

10. The method of claim 7, wherein the visual control consists of a combination of images and videos.

11. The method of claim 7, wherein generating the video is done by video interpolation.

12. The method of claim 7, wherein generating the temporally video is done by video extrapolation.

13. A system, comprising;
    a processor; and
    a memory storing instructions that, when executed by the processor, configure the system to perform operations comprising;
    accessing a multimodal video generation framework (MMVID) comprising a pretrained autoencoder, a language model, a mask-predict algorithm, and a pretrained non-autoregressive bidirectional transformer;
    receiving multimodal input signals; and
    generating a video by applying the MMVID to the multimodal input signals.

14. The system of claim 13, wherein the pretrained autoencoder comprises an encoder and a decoder, wherein the pretrained autoencoder is configured to obtain a quantized representation of images, and the pretrained non-autoregressive bidirectional transformer is pretrained on video tokens by a masked sequence estimation, a relevance estimation, and a video estimation.

15. The system of claim 13, wherein the multimodal input signals comprise a visual control and a textual control, wherein the textual control is produced by text augmentation of input text by the language model, wherein the textual control and the visual control are independent.

16. The system of claim 13, wherein the multimodal input signals comprise a visual control and a textual control, wherein the textual control is produced by text augmentation of input text by the language model, wherein the textual control and the visual control are dependent.

17. A non-transitory computer-readable storage medium including instruction that when executed by a processor perform operations comprising:
    accessing a multimodal video generation framework (MMVID) comprising a pretrained autoencoder, a language model, a mask-predict algorithm, and a pretrained non-autoregressive bidirectional transformer;
    receiving multimodal input signals; and
    generating a video by applying the MMVID to the multimodal input signals.

18. The non-transitory computer-readable storage medium of claim 17, wherein the pretrained autoencoder comprises an encoder and a decoder, wherein the pretrained autoencoder is configured to obtain a quantized representation for images, and the pretrained non-autoregressive bidirectional transformer is pretrained on video tokens by a masked sequence estimation, a relevance estimation, and a video estimation.

19. The non-transitory computer-readable storage medium of claim 17, wherein the multimodal input signals comprise a visual control and a textual control, wherein the textual control is produced by text augmentation of input text by the language model, wherein the textual control and the visual control are independent.

20. The non-transitory computer-readable storage medium of claim 17, wherein the multimodal input signals comprise a visual control and a textual control, wherein the textual control is produced by text augmentation of input text by the language model, wherein the textual control and the visual control are dependent.

* * * * *